(12) United States Patent
Rytivaara et al.

(10) Patent No.: US 7,453,443 B2
(45) Date of Patent: Nov. 18, 2008

(54) METHOD OF DEACTIVATING LOCK AND PORTABLE ELECTRONIC DEVICE

(75) Inventors: Markku Rytivaara, Oulu (FI); Mika Mustonen, Ii (FI); Timo Tokkonen, Oulu (FI)

(73) Assignee: Nokia Corporation, Espoo (FI)

( * ) Notice: Subject to any disclaimer, the term of this patent is extended or adjusted under 35 U.S.C. 154(b) by 371 days.

(21) Appl. No.: 10/518,220

(22) PCT Filed: Jun. 16, 2003

(86) PCT No.: PCT/FI03/00485

§ 371 (c)(1),
(2), (4) Date: Dec. 16, 2004

(87) PCT Pub. No.: WO04/001560

PCT Pub. Date: Dec. 31, 2003

(65) Prior Publication Data

US 2005/0253817 A1    Nov. 17, 2005

(30) Foreign Application Priority Data

Jun. 19, 2002   (FI) .................................. 20021197
Sep. 16, 2002   (FI) .................................. 20021655

(51) Int. Cl.
*G09G 5/00* (2006.01)

(52) U.S. Cl. ..................... 345/173; 345/175; 345/178; 345/212; 345/213; 345/214

(58) Field of Classification Search ................ 345/173, 345/175, 178, 212–214
See application file for complete search history.

(56) References Cited

U.S. PATENT DOCUMENTS

| | | | |
|---|---|---|---|
| 5,406,307 A * | 4/1995 | Hirayama et al. ........... 715/800 |
| 5,559,961 A | 9/1996 | Blonder | |
| 5,796,183 A | 8/1998 | Hourmand | |
| 6,209,104 B1 | 3/2001 | Jalili | |
| 6,476,797 B1 | 11/2002 | Kurihara et al. | |
| 6,720,860 B1 * | 4/2004 | Narayanaswami | ........ 340/5.54 |
| 6,862,687 B1 * | 3/2005 | Suzuki | ................. 726/18 |
| 2002/0029341 A1 | 3/2002 | Juels et al. | |
| 2004/0085351 A1 | 5/2004 | Tokkonen | |
| 2004/0245352 A1 * | 12/2004 | Smith | ................. 236/94 |

FOREIGN PATENT DOCUMENTS

| | | |
|---|---|---|
| EP | 0 453 089 A2 | 10/1991 |
| JP | 11203045 | 7/1999 |
| JP | 2002-082734 | 3/2002 |
| WO | WO 99/21073 | 4/1999 |
| WO | WO 01/77792 A2 | 10/2001 |

* cited by examiner

*Primary Examiner*—Richard Hjerpe
*Assistant Examiner*—Leonid Shapiro
(74) *Attorney, Agent, or Firm*—Hollingsworth & Funk, LLC

(57) ABSTRACT

The invention relates to a method of deactivating the touch screen lock in a portable electronic device comprising a touch screen and means for locking the touch screen. The method comprises detecting touches on predetermined contact areas on the touch screen in a given order during touch screen lock and deactivating the touch screen lock once said touches on said predetermined contact areas are detected. The invention also relates to a portable electronic device comprising a touch screen and means for locking the touch screen. The device comprises means for detecting touches on predetermined contact areas on the touch screen in a given order during touch screen lock and deactivating the touch screen lock once said touches on said predetermined contact areas are detected.

32 Claims, 6 Drawing Sheets

US 7,453,443 B2

METHOD OF DEACTIVATING LOCK AND PORTABLE ELECTRONIC DEVICE

FIELD

Figure 1A:
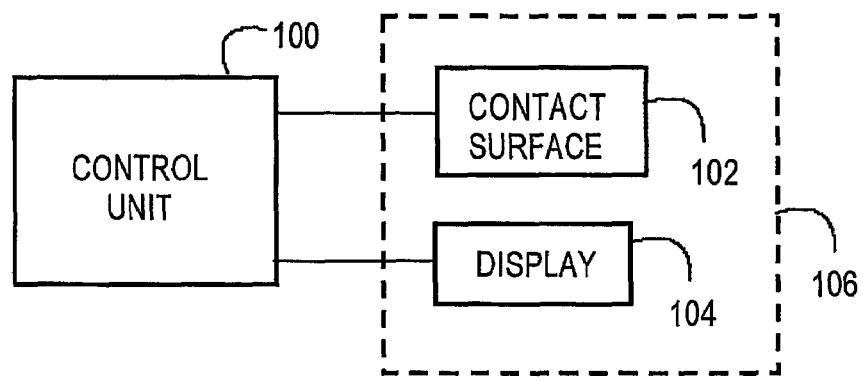

The invention relates to a portable electronic device and a method of deactivating the lock of a touch screen. The invention relates particularly to a device comprising a lockable touch screen.

BACKGROUND

In prior-art portable electronic devices, touch screens are used to replace the mouse and the keypad, for example. The user issues commands to the device by touching objects visible on the touch screen. The use of the touch screen lock state, such as a screensaver state, is known in devices having a touch screen, such as mobile stations having touch screens, to prevent the operation of the device when the touch screen is inadvertently touched for instance during transport or by the user. The touch screen can be locked for instance by depressing a key or keys in the keypad or by selecting said function using the menus on the touch screen. It is also usual for the touch screen to automatically enter a so-called screen saving state when the device is not used for a given time. When in the screen saving state, the touch screen may show so-called screen saver information, such as news reviews via an Internet connection. The screen saving state ends when the user touches the screen or the keypad or moves the mouse, for example. However, to prevent unauthorized use of the device, a special screensaver password may be taken into use, for example, and the user has to enter it for instance via the keypad to deactivate the screensaver state.

The drawback in prior art solutions is the difficulty in remembering special screensaver passwords. In addition, the use of screensaver passwords is especially hard for certain user groups, such as the elderly and handicapped. Furthermore, when for instance a person who is authorized to use the device but is not the person who specified the screensaver password wants to use the device, he has to know the password. If, again, no screensaver password is required to deactivate the screensaver state, the device may be subjected to unauthorized use or be activated unintentionally during transport, for example. Further, a separate input device, such as a keypad or a writing pad, is required for inputting screen save passwords, which complicates the use of a device having a touch screen.

BRIEF DESCRIPTION

An object of the invention is to provide a method and a device for implementing the method so as to alleviate prior art problems. This is achieved by a method of deactivating the touch screen lock in a portable electronic device comprising a touch screen and means for locking the touch screen. The method of the invention comprises: detecting touches on predetermined contact areas on the touch screen in a given order during touch screen lock, and deactivating the touch screen lock once said touches on the predetermined contact areas are detected.

The invention also relates to a portable electronic device comprising a touch screen and means for locking the touch screen. The device of the invention comprises means for: detecting touches on predetermined contact areas on the touch screen in a given order during touch screen lock and for deactivating the touch screen lock once touches on the predetermined contact areas are detected.

The preferred embodiments of the invention are disclosed in the dependent claims.

The method and portable electronic device of the invention provide a plurality of advantages. The invention simplifies the deactivation of the touch screen lock in a device. The touch screen lock can be easily deactivated without a separate device. The method of the invention is easy to use and easily learnable.

LIST OF THE FIGURES

Figure 1B:
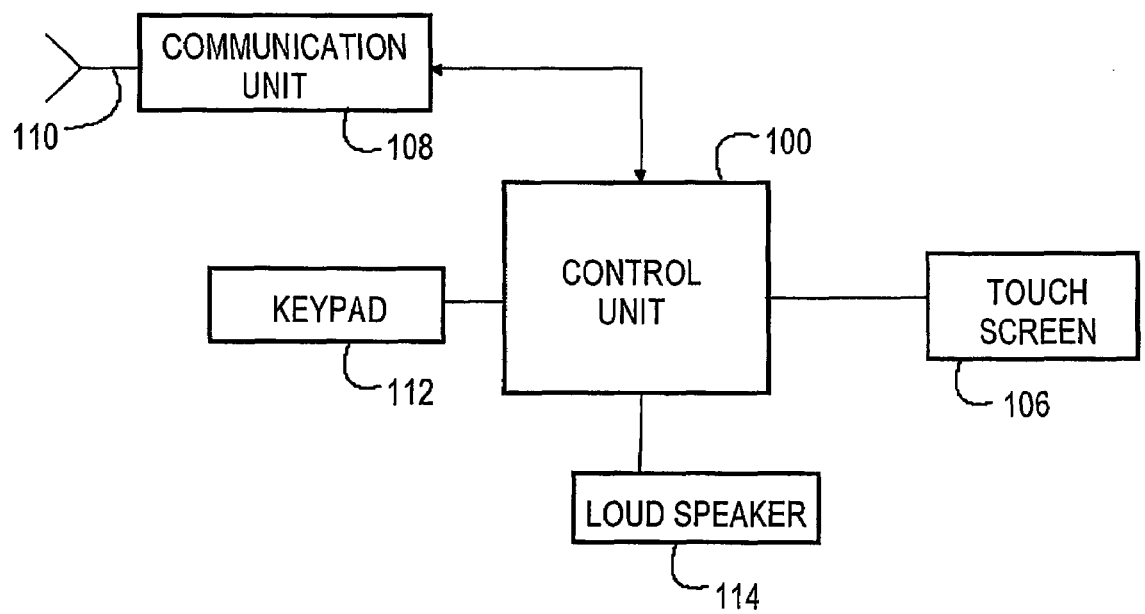
Figure 2:
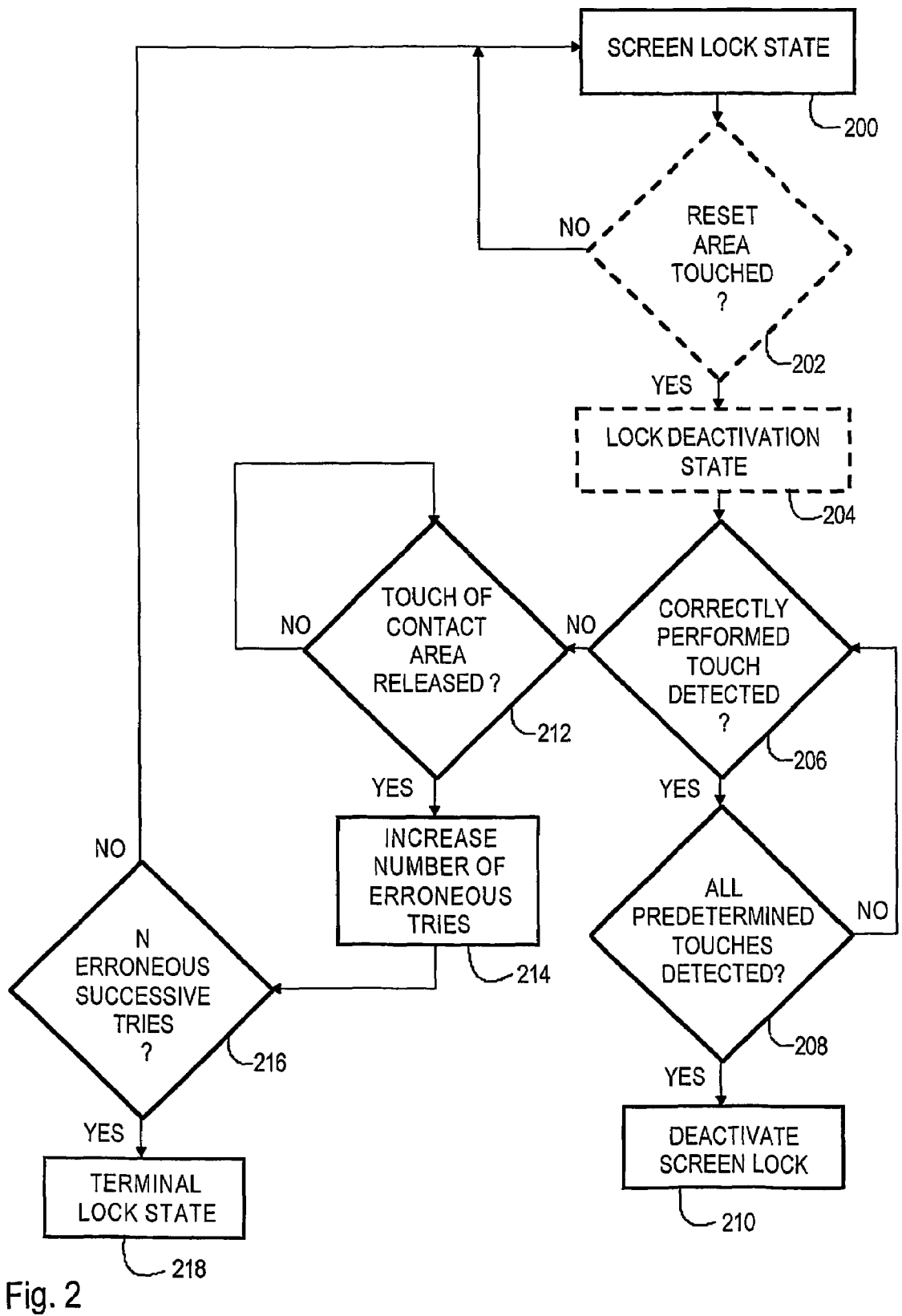
Figure 3A:
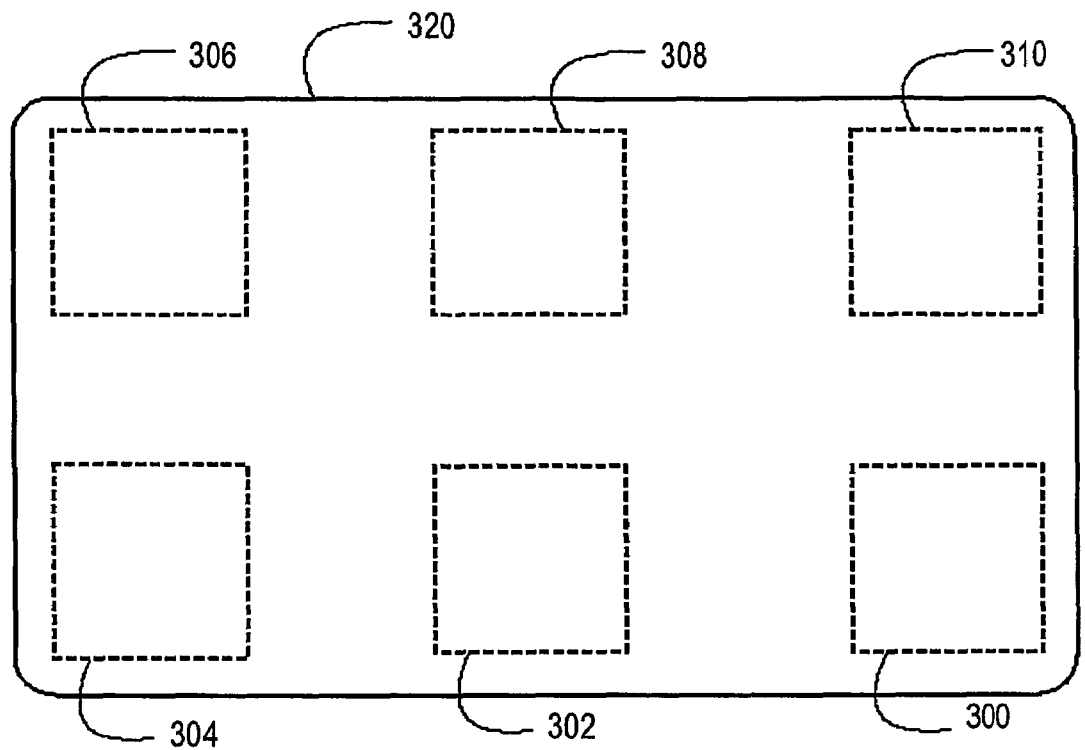
Figure 3B:
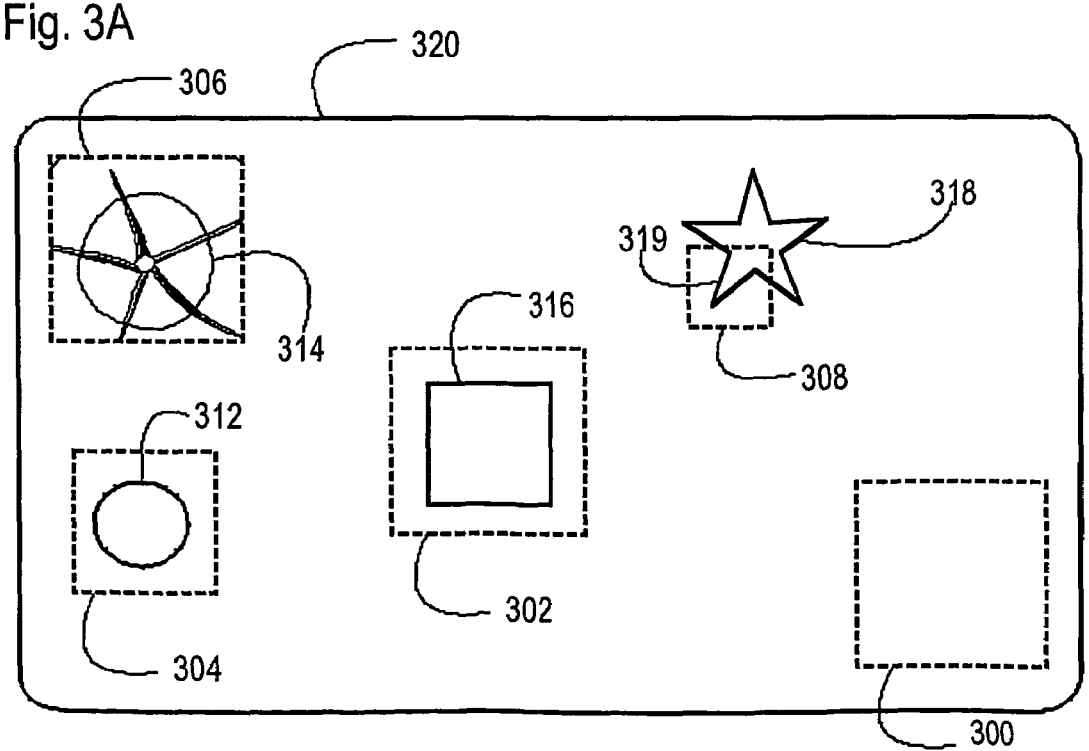
Figure 4:
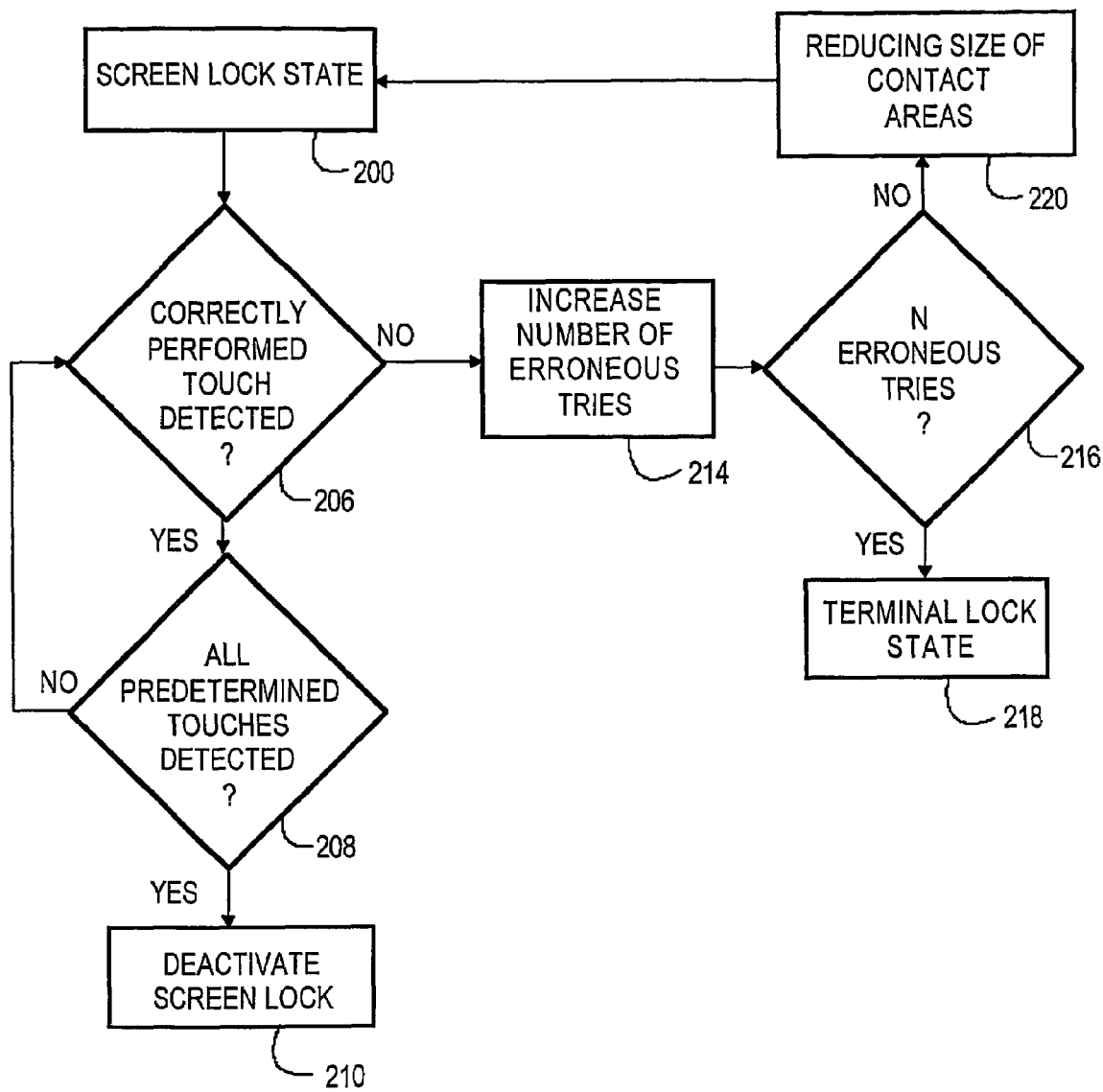
Figure 5A:
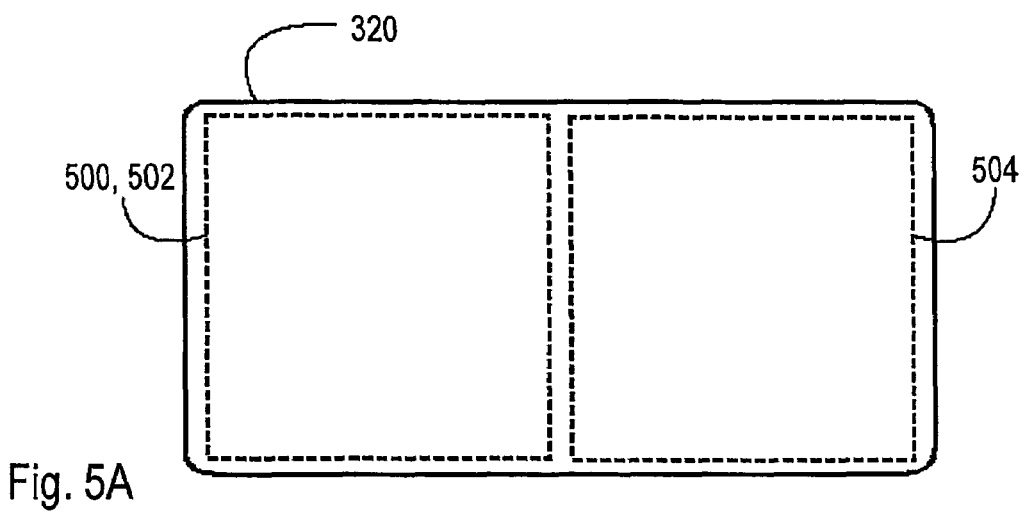
Figure 5B:
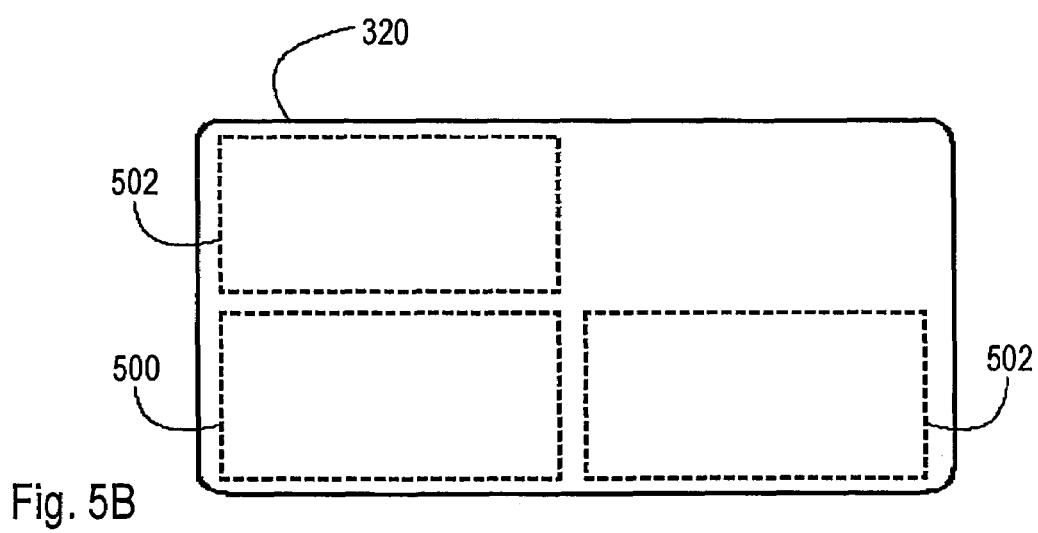
Figure 5C:
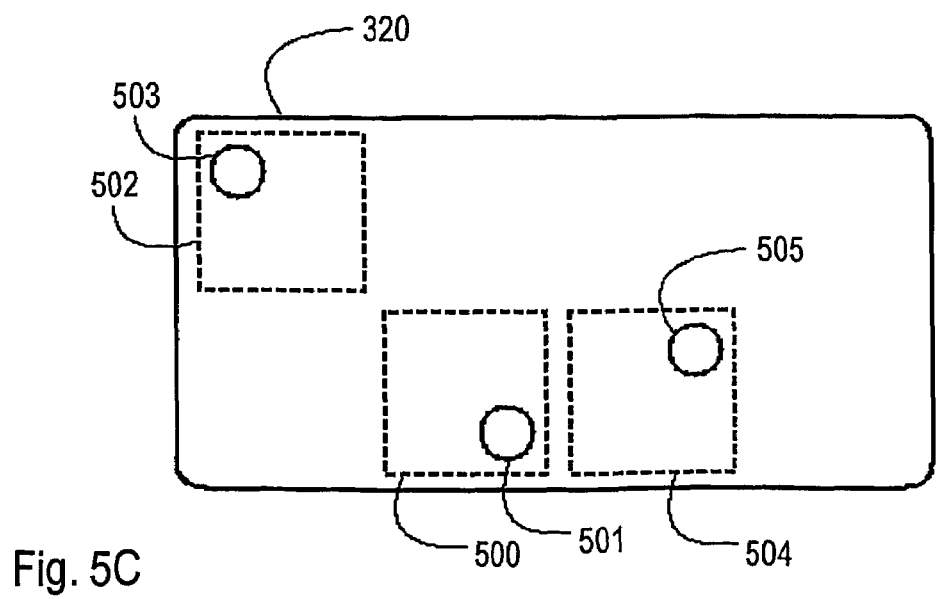
Figure 6:
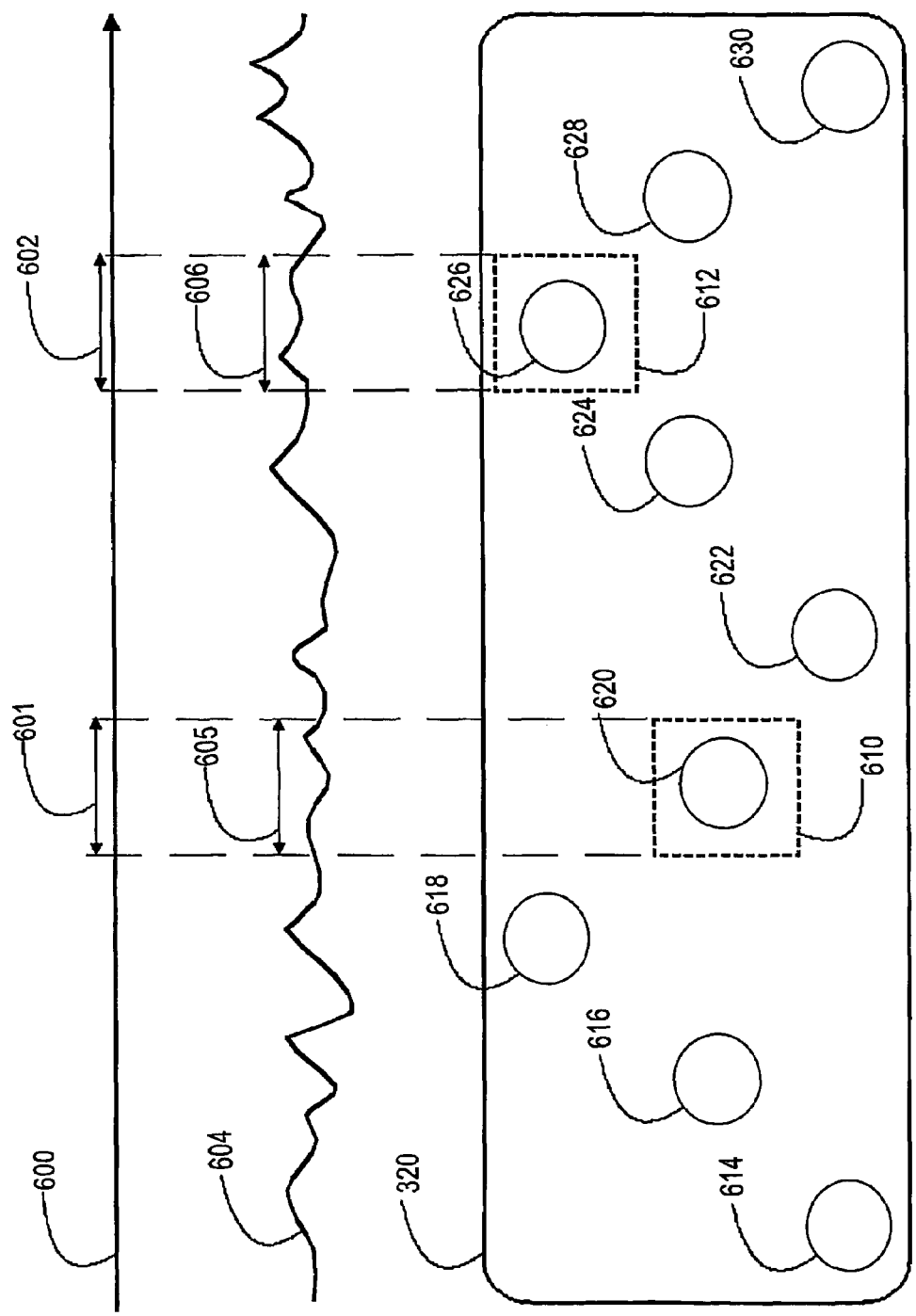

In the following, the invention will be described in detail in connection with preferred embodiments with reference to the accompanying drawings, in which FIGS. 1A and 1B show devices of the invention, FIG. 2 is a block diagram of an implementation of the invention, FIGS. 3A and 3B show a method of the invention, FIG. 4 is a block diagram of an embodiment of the invention, FIGS. 5A, 5B and 5C show a method of the invention, FIG. 6 shows a method of the invention.

DESCRIPTION OF THE EMBODIMENTS

The embodiments of the invention are applicable in portable electronic devices, such as a mobile station used as a terminal in telecommunication systems comprising one or more base stations and terminals communicating with the base stations. In some embodiments of the invention, the device includes means for short-range communication implemented by means of a Bluetooth chip, an infrared or WLAN connection, for example. The portable electronic device is e.g. a mobile telephone or another device including telecommunication means, such as a portable computer, a handheld computer or a smart telephone. The portable electronic device may be a PDA (Personal Digital Assistant) device including telecommunication means for establishing a network connection, or a PDA device that can be coupled to a mobile telephone, for instance, for a network connection. The portable electronic device may also be a computer or PDA device not including telecommunication means.

FIG. 1A shows a block diagram of the structure of a portable electronic device. The basic functions of the device are controlled by a control unit 100, typically implemented by means of a microprocessor and software or separate components. The user interface of the device comprises a display 104 and a contact surface 102, which together form a touch screen 106. An alternative is to have only a contact surface 102 and no display 104 at all. The touch screen 106 is accomplished by placing the contact surface 102 on top of the display 104. An alternative way to implement the touch screen 106 is not to actually place anything on top of the display 104, but to indicate the contact point by other means. Typically, the display 104 is a liquid crystal display.

A way to implement the contact surface 102 is based on two overlapping transparent films and continuous electric current, which is generated between the films when the outer film is pressed with a finger or another object against the lower film, which is covered with a resistive layer. The contact surface 102 may also be implemented capacitively, whereby the surface is covered with an electrically conducting layer, over which an alternating current acts. The capacitance of the human body couples part of the voltage at the contact point to ground, allowing the voltage to be measured. The contact surface 102 can also be implemented acoustically based on ultrasonic waves traversing the surface of the display. When the display is touched, the sonic wave traversing the surface is attenuated, and the change can be measured. The contact surface 102 may also be implemented with infrared light, and as well with said ultrasound, but using infrared light instead of sonic waves. It is also feasible to implement the contact surface 102 by means of power sensors or a projector and cameras. In principle, the contact surface 102 may be any surface on which an image is reflected with a projector and a camera is used to detect the point where the projected image was touched.

FIG. 1B is a block diagram of the structure of an electronic device. All basic functions of the device, including the keypad and the display, are controlled by the control unit 100, typically implemented by means of a microprocessor and software or separate components. The user interface of the device comprises a touch screen 106, which, as mentioned, is the whole formed by the contact surface 102 and the display 104 shown in FIG. 1A. In addition, the user interface of the device may comprise a loudspeaker 114 and a keypad part 112. Depending on the type of device, there may be different and a different number of user interface parts. The device of FIG. 1B, such as a mobile station, also comprises conventional means 108 that implement the functions of a mobile station and comprise speech and channel coders, modulators and RF parts. The device also comprises an antenna 110.

The touch screen 106 lock is activated by carrying out measures leading to the locking of the touch screen using the keypad 112 or the touch screen 106. The touch screen 106 may also automatically enter the lock mode when not used during a given time. During the lock state of the touch screen, the control unit 100 does not react to a touch of the contact area before the lock is deactivated. However, during the lock state of the touch screen, incoming calls can be answered as usual.

In the invention, the control unit 100 also detects a touch on predetermined contact areas on the touch screen in a given order during the touch screen 106 lock, such as in screensaver state. If certain predetermined contact areas are touched in a predetermined manner, in a given order and as touches of a given length, for example, the screen lock is deactivated. In addition to separate touches on the contact areas, the control unit 100 also interprets such a gliding touch over the contact areas, wherein the contact point moves on the touch screen 106 from a predetermined contact area to another when a finger or a pen, for example, is moved along the surface of the touch screen 106, to be touches on the contact areas. To deactivate the screen lock, the predetermined contact areas may also be touched by touching some contact areas and releasing the touch after the touching, while some other contact areas are touched with a gliding touch by moving a finger from one contact area to another without releasing the touch in the meantime.

In an embodiment of the invention, when the touch screen 106 is locked, the control unit 100 detects a touch on a given predetermined contact area, a reset area, and as a result of the detection, the device enters a state enabling the deactivation of the touch screen lock, wherein the touch screen lock can be deactivated by touching predetermined contact areas in a given order. In practice, touching said reset area when the touch screen is locked results in the software in the control unit memory detecting it as a predetermined reset area, and, as a result, a state enabling the deactivation of the touch screen lock is entered. The location of the reset area on the touch screen can be specified in the settings of the device, for example. There may also be more than one reset area on the touch screen, and the state enabling the deactivation of the touch screen lock may be entered by touching several reset areas in succession or simultaneously. The state enabling the deactivation of the touch screen lock may also be entered by means of another user interface part comprised by the device, such as a keypad. Although the device can react to a touch on predetermined contact areas during touch screen lock in the solution presented, the original protective purpose of the touch screen lock is not lost. One task of the touch screen lock is to prevent the entry into applications without the user's knowledge when the contact areas are pressed by mistake, for example. However, to deactivate the touch screen lock, the contact areas have to be touched several times in a given predetermined manner, in a given order, for example.

In a state enabling the deactivation of the touch screen lock, the control unit 100 analyzes if the predetermined contact areas of the touch screen 106 were touched in the given order. These predetermined contact areas may virtually form a given easily recalled pattern, such as a circle or a square, for example, on the touch screen 106. It is thus feasible that no contact areas are visible on the touch screen 106, but the touch screen may be entirely monochrome, for example. Consequently, the user has to know the locations of the contact areas. The device of the invention operates in such a way that the user is able to touch the predetermined contact areas not only by separately touching them, but also by gliding his finger along the surface of the touch screen 106 making the contact point of the finger pass via given predetermined contact areas in a given order.

The contact areas to be touched in a state enabling the deactivation of the touch screen lock can be specified by means of the user interface of the device. Different setting group functions, or user profiles, can be stored in the device, based on which the device operates in a given manner. By changing the user profile, the user may affect several settings of the device at the same time. The user profiles may specify the way of action of the touch screen lock or screensaver, such as how long the device has to be unused until the screensaver is activated or if a password has to be input when the screensaver is to be deactivated. The locations of the contact areas to be touched in a state enabling the deactivation of the touch screen lock are specified in the user profiles of the device, for example. It is also feasible to specify several different contact areas and combinations thereof, the successive touches of which deactivate the screen lock. In other words, for example each member of a family using the device may have a personal, easily recallable method of deactivating the touch screen lock by means of the contact areas, defined in different user profiles.

Once the control unit 100 detects a touch on given contact areas in the state enabling the deactivation of the locking, compares the detection with predetermined contact areas in its memory and detects that said contact areas were touched in a predetermined manner, in the right order, for example, the control unit 100 starts a software function that deactivates the touch screen lock.

A solution of the invention allows a function to be programmed, as a result of which the loudspeaker 114 issues a sound signal once the control unit 100 detects the right touching of a contact area. In an embodiment of the invention, the user is also able to select other signals than a sound signal to indicate that the right contact area was touched. Such a signal may be a physical indication, such as a vibration signal or a light signal, such as the blinking of the lights of the touch screen or the keypad. Signalling may also be part of different device user profiles specified by the user, for example in such a manner that in a given user profile, a touch on the right contact area results in a sound signal and in some other user profile the right touch results in a light signal.

Let us study a solution of the invention by means of the flow diagram in FIG. 2. In FIG. 2, alternative embodiments of the method are shown by steps marked with broken lines and arrows. In step 200, the touch screen lock of the device is activated, whereby on the touch screen may be shown a symbol or text indicative of the lock. Screensaver information may also be displayed on the touch screen during the touch screen lock, such as different news reviews from Internet news services obtained over an online connection. In step 206, the control unit monitors the state of the touch screen. If touching of a contact area is detected, it is checked if the touching is directed to a predetermined contact area, in the right order and of a suitable length as specified to be performed in the user profiles of the device, for example. If no touching is detected in step 206, the normal touch screen lock state is not exited.

In accordance with an alternative embodiment, before step 206, a reset area can be touched and a state enabling the deactivation of the lock can be entered. This provides for instance the advantage that if the touch screen areas are accidentally touched during the touch screen lock state, only a touch on the reset area initiates any software operations in the device. Only after a touch on the reset area will the control unit start to detect following touches on the contact areas and compare them with the predetermined contact areas in its memory. In step 200, the control unit thus monitors the state of the touch screen. If a contact area is touched, the control unit detects the touch and step 202 is entered, wherein the control unit checks if said contact area is a reset area. If the area touched is not a reset area, the touch screen lock state is not exited. If, in step 202, the control unit detects that the reset area was touched, step 204, allowing the touch screen lock to be deactivated, is entered.

If no touching is detected in the state enabling lock deactivation in step 204 during a period of a certain length, for example because the reset area was unintentionally touched in step 202, the state enabling lock deactivation is exited and the normal touch screen lock state 200 is re-entered. The length of time during which the user has to touch a predetermined contact area, having touched the reset area, to deactivate the touch screen lock is a couple of seconds, for example. The length of this time may also be predetermined by the user by means of the user interface of the device.

If a touch is detected in step 206 and it is directed to a predetermined contact area and performed in the manner described for example in the user profiles of the device, the next step entered is 208. Consequently, touching the right contact area in the right order is not necessarily sufficient, but the length of touching each contact area may also be specified as part of the correct procedure. The correct procedure may also comprise the simultaneous touching of several contact areas. In step 208, a check is made to see if all touches on the predetermined contact areas intended to deactivate the screen lock state are detected. If not all touches on the predetermined contact areas are detected, step 206 is re-entered, and the following touch on a contact area is monitored. If, again, it is detected in step 208 that all predetermined touches on the contact areas are performed, step 210 is entered, wherein the touch screen lock is deactivated.

If it is detected in step 206 that the detected touch on the contact area is not performed in the right order, for example, the wrong contact area was touched or the touching of the contact area failed completely, step 212 is entered. In step 212, the control unit monitors the release of the touch on the contact area. If the control unit detects in step 212 that the touch on the contact area is not detached, i.e. the touch is not released, the process remains in step 212. The process remains in step 212 until a release of the touch on the contact area is detected, and then step 214 is entered, where the number of erroneous tries is increased, i.e. erroneous tries are entered in a memory, for example in the flash memory of the device or a network. Next, in step 216, the process checks if the current erroneous try was an nth successive erroneous try. Said nth number can be defined in a suitable manner. For example, three erroneous tries could be allowed before step 218, device lock state, is entered. If the wrong try to touch detected in step 216 is, for example, the first one, the process enters step 200, where the touch screen of the device is locked. In other words, the user is given a new chance to try to deactivate the touch screen lock. If it is noted in step 216 that an nth, for instance third, successive erroneous attempt to deactivate the lock is concerned, step 218, device lock state, is entered. Deactivating the device lock state 218 requires measures taken by an authorized device serviceman, for example. Alternatively, the lock state 218 can be deactivated for example via a service obtained through the Internet. In situations when the user does not remember the right procedure for touching the contact areas, it is also feasible that help be obtained from an authorized reliable service provider via the Internet or the telephone network, for example.

Before the screen lock state deactivation in step 210, a touching of the reset area may be alternatively required after the performed predetermined touching of the contact areas. In this case, the control unit monitors the detection of the touching of said reset area. If said touching of the reset area after the touching of predetermined contact areas is required, and is not detected for instance within a given predetermined period, the touch screen lock state in step 200 is again entered. If, again, the required touching of the reset area is detected, step 210, where the screen lock state is deactivated, is entered only thereafter.

Some embodiments of the invention will be studied next by means of FIGS. 3A and 3B. FIG. 3A shows a touch screen 320 of a device. Areas 300 to 310, shown with broken lines in FIG. 3A, are predetermined contact areas, the touching of which in a given order results the deactivation of the screen lock. Contact areas 300 to 310 are not actually visible on the touch screen 320, but the user knows their location based on the contact area specifications he made in advance. Alternatively, the contact areas 300 to 310 may be denoted on the touch screen 320 using outlining, for example. The contact areas to be touched may be selected at the desired locations of the touch screen. The contact areas may also be selected by using pre-selectable screen divisions programmed in the device by dividing the touch screen into parts of the desired size. The touch screen 320 itself may be totally monochrome or show full-screen news channel information when the touch screen of the device is locked. To deactivate the locking, predetermined contact areas are touched in a given order. To deactivate the locking of the touch screen 320 of FIG. 3A, the contact areas 300 to 310 have to be touched for example in the following order: 300, 302, 304, 306, 308 and 310. It is also feasible that touching in the right order is not sufficient, but the contact areas 300 to 310 have to be touched for a predetermined length of time. The touching of the contact areas 300 to 310 has to be performed for example by touching contact areas 300 to 310 by keeping a finger or a pen on top of contact areas 300, 304 and 308 twice longer than on top of contact areas 302, 306 and 310.

If the predetermined contact areas 300 to 310 are touched in the predetermined manner, the touch screen lock is deactivated. If, again, an error occurs in the touching of the contact areas 300 to 310, one of the contact areas 300 to 310 is touched in the wrong order, for example, a message indicating the error may be visible on the touch screen. It is then possible to retry touching the right contact areas 300 to 310 until too many erroneous tries result in the activation of the device lock state. An embodiment of the invention allows the location of one or more predetermined contact areas 300 to 310 on the touch screen 320 to be changed after an erroneous touch to a predetermined second point, which is different from where the contact area 300 to 310 was located before the erroneous touch. After an erroneous touch, the shape of the contact areas 300 to 310 may also be different than before the touch. For example, the square contact areas 300 to 310 in FIG. 3A are changed to a triangular form after an erroneous touch.

Area 300 outlined with broken lines in the example of FIG. 3A is alternatively a reset area, and, when touched during touch screen lock, transfers the device into a state enabling lock deactivation. The reset area 300 is not actually visible on the touch screen, but the user knows it is located at the lower right corner of the touch screen, for example. Alternatively, e.g. a symbol, image or letter referring to the reset area may exist at the location of the reset area. The user himself may specify the location of the reset area by means of the settings of the device. The areas 302, 304, 306, 308 and 310, outlined with broken lines in FIG. 3A, are predetermined contact areas, and touching them in a predetermined order results in touch screen lock deactivation. The contact areas 302, 304, 306, 308 and 310 are not either necessarily visible on the touch screen, but the user knows their location based on contact area specifications he made in advance. For disabling the touch screen lock of the device, a state enabling lock deactivation is first initiated by touching the reset area 300. Once the reset area 300 is touched, a text or symbol indicative of the lock deactivation state may be visible on the touch screen. A sound or light signal may also be a sign of the lock deactivation state. Alternatively, no separate indication of the lock deactivation state is given, but the user begins to touch the predetermined lock deactivation contact areas after touching the reset area without a separate sign.

Touching the predetermined contact areas 302 to 310 in a given order in a predetermined manner also now results in the deactivation of the touch screen lock. After touching the contact areas 302 to 310, the reset area 300 may have alternatively to be touched again, before the touch screen lock is deactivated.

FIG. 3B shows the touch screen 320 of a device, predetermined contact areas 300, 302, 304, 306, 308 outlined with broken lines, and images 312, 314, 316, 318 visible on the touch screen. A preferred embodiment of the invention enables the specification of background images for facilitating the remembering of the predetermined contact areas to be visible on the touch screen, such as images, symbols, photos or multimedia. The different figures 312, 314, 316, 318 or photos, for example, shown on the touch screen facilitate the remembering of personal predetermined contact areas. In FIG. 3B, to deactivate the touch screen 320 lock of the terminal, a reset area 300, for example, is first touched. The next predetermined contact areas to be touched are, for example, 302, 304, 306 and 308. The user has used the user interface of the device to specify in advance that the first contact area 302 to be touched is at the square figure 316, the second contact area 304 is at the ball-like figure 312, the third contact area 306 is at anotherball-like figure 314 and the contact area 308 to be touched last is at an arm 319 of the star-like figure 318. Although in the case of FIG. 3B, the locations of the contact areas 302 to 308 are not particularly easy to remember on the touch screen 320, it is, however, simple to remember the locations of the contact areas 302 to 308 on the touch screen 320 by means of the different figures 312, 314, 316, 318.

The location of the contact areas can thus be specified for example such that they are located by easily recallable details of a background picture shown on the touch screen 320. It is also possible to specify a plurality of background images, which are alternatively visible on the touch screen 320 when the touch screen lock is activated. In this case, the predetermined contact areas are touched by touching one or more details of a given background image. A period of time is then allowed to lapse before the next background image appears on the touch screen, and one or more contact areas of said background image are then touched. It is also possible to combine time and place to the predetermined contact areas. A contact area can be specified for example such that when an animation is visible on the touch screen 320, a point specified as a contact area has to be touched at a predetermined point in time. In this case, the contact area to be touched first could be for example the engine of a train moving on the touch screen at the point in time when the engine is at a house visible on the touch screen. The second contact area to be touched could be the second carriage of the train moving on the touch screen 320 at the point in time when the engine of the train leaves the touch screen 320.

Voice and image may also be combined with the contact areas. An image of the keys of a piano, for example, could be shown on the touch screen 320, and the contact areas can be specified to be located at given piano keys visible on the touch screen. When the user touches the predetermined contact areas, the loudspeaker of the terminal gives a sound signal whose pitch depends on the location of the contact area selected in the image of the touch screen 320 relative to the visible piano keyboard. As the user touches predetermined contact areas, he simultaneously "plays" a familiar tune. This is a way for the user to easily remember the locations of predetermined contact areas for instance by means of a selected familiar tune.

Let us next use the flow diagram in FIG. 4 to study an embodiment of the invention. As in the flow diagram of FIG. 3, in FIG. 4, too, in step 200, the touch screen lock of the device is activated, a symbol or text indicative of the lock being visible on the touch screen. In step 206, the control unit monitors the state of the touch screen. If a touch on a contact area is detected, a check is made to see if the touch was directed to a predetermined contact area, in the right order and as a touch having the correct length, for example, as specified in the user profiles of the device, for example.

If, in step 206, a touch is detected and it is directed to a predetermined contact area, the next step 208 is entered. In step 208, a check is made to see if all touches on the contact areas intended to deactivate the screen lock state are detected. If not all predetermined touches on the contact areas are detected, the process returns to step 206 to monitor the next touch on a contact area. If, again, it is detected in step 208 that all predetermined touches on the contact areas are performed, step 210 is entered and the touch screen lock is deactivated.

If it is detected in step 206 that the detected touch on a contact area is not performed in the correct order, for example, or the wrong contact area was touched or the touch on the contact area failed altogether, then step 214 is entered and the number of erroneous tries is incremented, i.e. the erroneous tries are stored, for instance in the flash memory of the device or the network. Next, in step 216, it is checked if the current erroneous try is an nth successive erroneous try. Said number n can be determined as is suitable. If, in step 216, it is detected that an nth, e.g. fifth, successive erroneous try to deactivate the lock is concerned, then the device lock state in step 218 is entered. Cancelling the lock state 218 of the device requires measures by an authorized serviceman, for example. Alternatively, the lock state 218 can be cancelled for example by a service obtained via the Internet. Assistance may also be obtained from an authorized, reliable service provider for instance via the Internet or the telephone network in a situation when the user does not remember the correct touch on the contact areas.

If the erroneous touch detected in step 216 is for instance the first, step 220 is entered, where the size of the predetermined contact areas is reduced. The size of the predetermined contact areas is reduced by 25 percent, for example. The touch screen lock state in step 200 is then re-entered. The user is given a new chance to try to deactivate the touch screen lock, but the reduced size of the contact areas to be touched makes the touching of the contact areas slightly more difficult than previously. If the user again fails to touch the correct predetermined contact area, the size of the predetermined contact areas is further reduced in accordance with step 220. This is continued until the number of successive erroneous tries is for instance n, after which the terminal lock state is entered in step 218.

The terminal lock state situation of step 218 can be entered for example because of unauthorized use of the device. The authorized user of the device may specify for instance a desired reset command, which is given to restore the original settings. Such a reset command is e.g. a touch on a part or parts of the touch screen or the keypad or some other function known only to the user. The reset command enables the user to restore the original state of the device, where the size of the predetermined contact areas is not reduced.

Let us next study an embodiment of the invention by means of FIGS. 5A, 5B and 5C. FIGS. 5A, 5B and 5C show the touch screen 320 of the device. The areas 500 to 504 outlined by dashed lines are predetermined contact areas, the touching of which in a given order achieves the deactivation of the screen lock. In the example of FIG. 5A, the contact areas 500 and 502 are in the same area of the touch screen 320. The contact areas 500 to 504 are not actually visible on the touch screen 320. Alternatively, the contact areas 500 to 504 may be visible on the touch screen 320 by outlines, for example. The contact areas to be touched may be selected at desired locations on the touch screen. The actual touch screen 320 may be for instance totally monochrome or news channel information may scroll on the entire screen when the touch screen of the device is locked.

To deactivate the lock, the predetermined contact areas are touched in a given order. In the case of FIGS. 5A, 5B and 5C, the user has specified three contact areas 500, 502, 504 in the setting of the device, for example, the touching of which in the order 500, 502 and 504 deactivates the lock. The number of contact areas for deactivating the lock can be freely selected as desired.

FIG. 5A shows an initial situation, where the predetermined three contact areas 500, 502, 504 are very large. A touch on a predetermined contact area is correct when the touch hits any area of the predetermined contact area. Consequently, in the situation of FIG. 5A, it very easy for the user to deactivate the touch screen lock using quite careless touches. In the situation of FIG. 5A, the user has to touch contact area 500 first. The touch must then be directed to contact area 502, which in the example of FIG. 5A is in the same area of the touch screen 320 as contact area 500. The last touch has to be directed to contact area 504.

If the user touches the wrong contact area, for example, in the situation of FIG. 5A, the size of contact areas 500, 502, 504 is reduced. FIG. 5B shows a situation where the size of contact areas 500, 502, 504 is reduced because of an erroneous touch. However, the touch screen 320 does not necessarily display any signalling indicating that the contact areas 500, 502, 504 are reduced. However, the correct touch now requires more accuracy than in the situation of FIG. 5A.

If the user touches the wrong contact area a second time in the situation of FIG. 5B, the size of contact areas 500, 502, 504 is reduced further. FIG. 5C shows a situation where the size of contact areas 500, 502, 504 is reduced because of a second erroneous touch. Contact areas 500, 502, 504 may be reduced further after each erroneous touch until n successive erroneous tries have been made, for example, or other means may be employed, such as a reset command known only to the user, to restore a normal state.

The authorized user of the device may have used the user interface of the device to predetermine the contact areas to be touched in a given order to deactivate the touch screen lock. In practice, the user specifies the desired details of the contact areas to be touched on the touch screen at points 501, 503 and 505, for example, denoted by circles in FIG. 5C. When the touch screen is locked, the actual contact areas to be touched are significantly large when the device is in the normal state, such as the contact areas 500, 502, 504 in FIG. 5A. Even if the contact areas 500, 502, 504 were reduced because of erroneous touches, the authorized user of the device is able to deactivate the touch screen 320 lock at any time by touching the details 501, 503, 505 on said contact areas 500, 502, 504 irrespective of whether erroneous tries were made previously, i.e. if the contact areas 500, 502, 504 have been reduced or not. On the other hand, in a situation of FIG. 5A, when erroneous touches have not been made, the selection of the predetermined contact areas is particularly easy, since the touches are detected on a wide contact area 500, 502, 504. It is also feasible that after a few erroneous touches, for example, a touch on the correct contact area 500, 502, 504 is not enough to deactivate the touch screen lock, but a touch on a predetermined detail 501, 503, 505 on the contact area 500, 502, 504 is required.

The contact area 500, 502, 504 is reduced because of an erroneous touch for example by moving one or more edges of the contact area 500, 502, 504 closer to the detail 501, 503, 505 of the contact area 500, 502, 504 predetermined by the user. The extent to which the size of the contact areas 500, 502, 504 is reduced after erroneous touches can be specified by means of the user interface of the device. Alternatively, the device may include selectable function alternatives including varying reductions of the contact areas 500, 502, 504. After the reduction, the shape of the contact areas 500, 502, 504 is not necessarily the same as before the reduction. After the reduction the shape of the contact areas 500, 502, 504 may be for instance a circle or a triangle, even if their shape before the reduction was square. The visuality of the contact areas 500, 502, 504 can also be specified. The current size of the contact areas 500, 502, 504 may be visible on the touch screen 320, for example by outlines or colours. Furthermore, extra marked contact areas may be visible on the touch screen 320 in addition to the predetermined contact areas 300, 302, 304, to further complicate the actions of any unauthorized users. In addition, the use of various background images is possible to facilitate remembering the predetermined contact areas 500, 502, 504.

Let us next study an embodiment of the invention by means of the example in FIG. 6. FIG. 6 shows the touch screen 320 of a device. During touch screen 320 lock, animation or multimedia presentation, for example, is displayed on the touch screen 320. FIG. 6 illustrates a simple animation by means of circles 614 to 630, which represent the movement of a ball shown in the animation in the area of the touch screen 320 at different points in time. Actually, only one circle is visible on the touch screen 320. In FIG. 6, time line 600 illustrates the time. FIG. 6 also shows timeslots 601, 602. FIG. 6 further shows contact areas 610, 612 for the deactivation of the touch screen 320 lock and an audio sequence 604, which is music, for example.

As in the method shown in FIG. 2, in the example of FIG. 6, the user also touches for instance the reset area (not shown in FIG. 6) during touch screen 320 lock, whereby the device enters a state enabling the deactivation of the lock. Following the detection of a touch on the reset area, the control unit in the device initiates a software function, and as a result, the device starts to play an audio sequence 604, for instance a familiar piece of music. The audio sequence 604 may also be played repeatedly always when the touch screen 320 lock is activated. In the state enabling the deactivation of the lock, the user has to touch the predetermined contact areas 610, 612 during the predetermined timeslots 601, 602 to deactivate the touch screen 320 lock. Thus, in the example of FIG. 6, the user has to touch contact area 610 during timeslot 601 and contact area 612 during timeslot 602 to deactivate the touch screen 320 lock. The audio sequence 604 is played to facilitate remembering the predetermined timeslots 601, 602. The animation, in turn, is displayed to facilitate remembering the contact areas 610, 612 to be touched.

Accordingly, the user specifies not only the contact areas 610, 612 to be touched but also audio areas 605, 606 for the desired audio sequence 604, such as easily recognizable points of a familiar piece of music, in such a manner that the user has to touch the contact areas 610, 612 during said selected audio areas 605, 606 in order to deactivate the touch screen 320 lock. The audio areas 605, 606 of the audio sequence 604 shown in FIG. 6 are thus played during the timeslots 601, 602. In addition to an audio sequence 604, a vibration code may also be specified, which is activated for instance parallel to the audio sequence 604. In this case, the user may touch the predetermined contact area 610, 612 for instance after a given number of vibration impulses. The control unit in the device detects the touches that are directed to the predetermined contact areas 610, 612. The control unit also detects the timeslots 601, 602 during which the touch on the contact areas 610, 612 was detected. Next, the control unit performs a comparison to check that the detected touches are performed at the right time and in the manner specified for instance in the user profiles of the device, after which the touch screen 320 lock is deactivated.

Although the invention is described above with reference to the example according to the accompanying drawings, it is apparent that the invention is not limited thereto, but can be modified in a variety of ways within the scope of the inventive idea disclosed in the attached claims.

The invention claimed is:

1. A method of deactivating a touch screen lock in a portable electronic device comprising a touch screen and means for locking the touch screen, the method comprising:
specifying, in user profiles, contact areas based on whose touching the touch screen lock is deactivated;
detecting touches on the predetermined contact areas on the touch screen in a given order during touch screen lock; and
deactivating the touch screen lock once said touches on the predetermined contact areas are detected.

2. A method as claimed in claim 1, the method further comprising reducing the size of the predetermined contact areas when a touch on a predetermined contact area fails.

3. A method as claimed in claim 2, the method comprising reducing the size of the predetermined contact areas by at least 25 percent.

4. A method as claimed in claim 1, the method further comprising detecting a touch on a predetermined reset area on the touch screen during touch screen lock, and entering touch screen lock deactivation state based on the touch on the reset area.

5. A method as claimed in claim 4, the method comprising exiting the touch screen lock deactivation state when the touch on the predetermined contact area fails.

6. A method as claimed in claim 4, the method comprising exiting the touch screen lock deactivation state when no touch on the contact area on the touch screen is detected within a predetermined period of time.

7. A method as claimed in claim 1, the method further comprising detecting a touch on the reset area after a touch on the predetermined contact areas.

8. A method as claimed in claim 7, the method comprising accepting the deactivation of the touch screen lock based on the detection of a touch on the predetermined contact areas and a touch on the reset area.

9. A method as claimed in claim 1, the method further comprising detecting a touch on the predetermined contact areas of the touch screen when the touch on the contact area continues for a predetermined period of time.

10. A method as claimed in claim 1, the method further comprising entering the device lock state when the touch on the contact areas occurs in a non-predetermined manner a predetermined number of times in succession.

11. A method as claimed in claim 1, the method further comprising issuing a signal when a touch on a predetermined contact area is detected.

12. A method as claimed in claim 11, wherein said signal is a sound, light or vibration signal.

13. A method as claimed in claim 1, the method further comprising deactivating the touch screen lock when a touch on said predetermined contact areas is detected during predetermined timeslots.

14. A method as claimed in claim 13, the method comprising playing a predetermined sound during the touch screen lock to facilitate remembering the predetermined timeslots.

15. A method as claimed in claim 1, the method further comprising displaying one or more predetermined background images, animations or multimedia presentations on the touch screen during touch screen lock in order to facilitate remembering the predetermined contact areas.

16. A method as claimed in claim 1, wherein the contact areas defined in the user profile for deactivating the touch screen lock are different in different user profiles.

17. A portable electronic device comprising:
a touch screen; and
a control unit configured to
specify, in user profiles, contact areas based on whose touching a touch screen lock is deactivated,
detect touches on the predetermined contact areas on the touch screen in a given order during touch screen lock; and
deactivate the touch screen lock once said touches on the predetermined contact areas are detected.

18. A device as claimed in claim 17, wherein the device comprises means for reducing the size of the predetermined contact areas when a touch on a predetermined contact area fails.

19. A device as claimed in claim 18, wherein the device comprises means for reducing the size of the predetermined contact areas by at least 25 percent.

20. A device as claimed in claim 17, wherein the device comprises means for detecting a touch on a predetermined reset area on the touch screen during touch screen lock, and entering a touch screen lock deactivation state based on the touch on the reset area.

21. A device as claimed in claim 20, wherein the device comprises means for exiting the touch screen lock deactivation state when a touch on the predetermined contact area fails.

22. A device as claimed in claim 20, wherein the device comprises means for exiting the touch screen lock deactivation state when no touch on the contact area on the touch screen is detected within a predetermined period of time after a touch on the reset area.

23. A device as claimed in claim 17, wherein the device comprises means for detecting a touch on the reset area after a touch on the predetermined contact areas.

24. A device as claimed in claim 23, wherein the device comprises means for accepting the deactivation of the touch screen lock based on a touch on the predetermined contact areas and a touch on the reset area.

25. A device as claimed in claim 17, wherein in the device comprises means for detecting a touch on the predetermined contact areas of the touch screen when the touch on the contact area continues for a predetermined period of time.

26. A device as claimed in claim 17, wherein the device comprises means for entering a terminal lock state when a touch on the contact areas occurs in a non-predetermined maimer a predetermined number of times in succession.

27. A device as claimed in claim 17, wherein the device comprises means for issuing a signal when a touch on a predetermined contact area is detected.

28. A device as claimed in claim 27, wherein said signal is a sound, light or vibration signal.

29. A device as claimed in claim 17, wherein the device comprises means for deactivating the touch screen lock when touches on said predetermined contact areas are detected during predetermined timeslots.

30. A device as claimed in claim 29, wherein the device comprises means for playing a predetermined sound during the touch screen lock to facilitate remembering the predetermined timeslots.

31. A device as claimed in claim 17, wherein the device comprises means for displaying one or more predetermined background images, animations or multimedia presentations on the touch screen during touch screen lock in order to facilitate remembering the predetermined contact areas.

32. A device as claimed in claim 17, wherein the contact areas defined in the user profile for deactivating the touch screen lock are different in different user profiles.

* * * * *